United States Patent [19]

Gütlhuber et al.

[11] 4,099,926

[45] Jul. 11, 1978

[54] MULTISTAGE REACTOR

[75] Inventors: Friedrich Gütlhuber, Metten; Adolf Jäger, Plattling; Heinrich Ufholz, Deggendorf, all of Germany

[73] Assignee: Deggendorfer Werft und Eisenbau G.m.b.H., Deggendorf, Germany

[21] Appl. No.: 624,289

[22] Filed: Oct. 20, 1975

[30] Foreign Application Priority Data

Oct. 19, 1974 [DE] Fed. Rep. of Germany ....... 2449789

[51] Int. Cl.² .......................... B01J 4/00; B01J 8/04; B01J 8/10; B01J 8/12
[52] U.S. Cl. ................... 23/286; 23/288 R; 23/288 E; 23/288 G; 23/288 K
[58] Field of Search ............. 23/288 R, 288 E, 288 F, 23/288 G, 288 K, 286; 208/169, 146

[56] References Cited

U.S. PATENT DOCUMENTS

| | | | |
|---|---|---|---|
| 2,795,488 | 6/1957 | Reitzel et al. | 23/288 R |
| 2,891,847 | 6/1959 | Vaell et al. | 23/288 G |
| 2,893,942 | 7/1959 | Berg | 23/288 G X |
| 3,067,129 | 12/1962 | Dauber et al. | 208/146 X |
| 3,186,806 | 6/1965 | Stiles | 23/288 B |
| 3,267,024 | 8/1966 | Vaell | 23/288 G X |
| 3,497,328 | 2/1970 | Calvert | 23/288 B UX |
| 3,506,408 | 4/1970 | Kageyama et al. | 23/288 R |
| 3,751,227 | 8/1973 | Robinson | 23/286 X |
| 3,799,866 | 3/1974 | Lengemann | 23/288 G X |
| 3,918,930 | 11/1975 | Forbes | 23/288 R X |

FOREIGN PATENT DOCUMENTS

| | | |
|---|---|---|
| 2,165,266 | 4/1973 | Fed. Rep. of Germany. |
| 106,420 | 2/1943 | Sweden ............................. 23/288 R |

Primary Examiner—Morris O. Wolk
Assistant Examiner—Michael S. Marcus
Attorney, Agent, or Firm—Toren, McGeady and Stanger

[57] ABSTRACT

A plurality of catalyzer beds are arranged in series in a reactor jacket. Associated with each catalyzer bed is a plurality of distributor pipes for supplying a fresh catalyst and a plurality of draining pipes for draining off the used catalyst. In one embodiment, the reactor jacket is rotatable and the plurality of distributor pipes are connected to an upper edge of the catalyzer bed while the plurality of draining pipes are connected to a lower edge of the catalyzer bed so that when the reactor jacket is rotated to a position that tilts the catalyzer beds the used catalyst will drain off. In another embodiment, the lower surface of the catalyzer beds are formed of two pivotable plates which pivot downwardly and away from each other to allow for the draining of the used catalyst. In still another embodiment of the invention, the heat exchangers are mounted below the catalyzer beds, and each catalyzer bed is provided with at least one supporting plate which divides the catalyzer bed into a plurality of sections parallel with the flow of the reactive gas through the catalyzer beds. Suction means may be used to supply catalyst to the catalyzer beds and to drain the used catalyst from the catalyzer beds.

12 Claims, 8 Drawing Figures

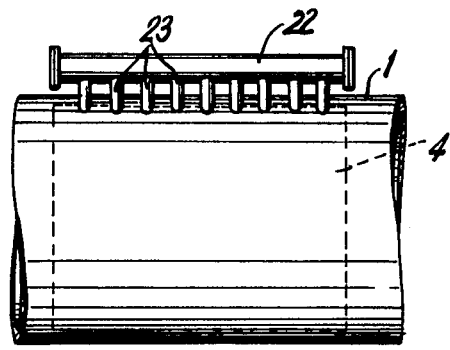
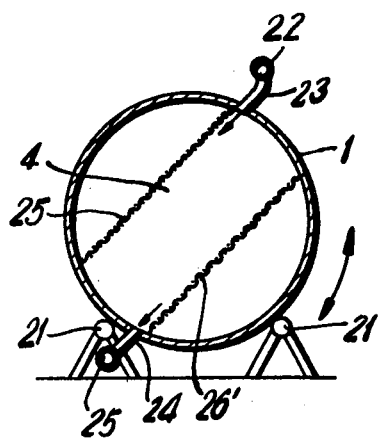
FIG.6  FIG.5
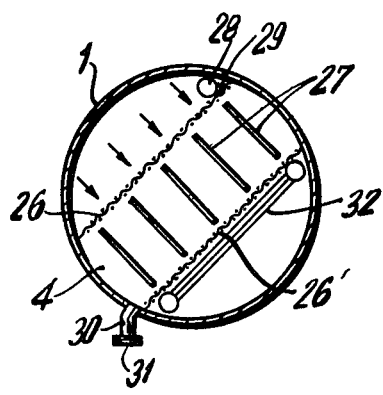
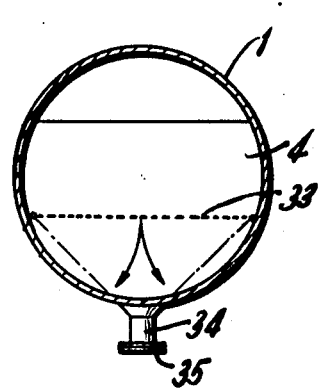
FIG.7  FIG.8

MULTISTAGE REACTOR

BACKGROUND OF THE INVENTION

The invention relates to a multi-stage hurdle-type reactor, for catalytic, exothermic and endothermic chemical processes, a heat exchanger being co-ordinated with each catalyser bed. In the case of a reaction plant of this kind, the catalyst used for performing a chemical reaction wigh a gas, which commonly consists of a granular mass, must be removed after some time for regeneration or replacement.

Different systems already exist for replacing the catalyst for reactors, which are especially intended and appropriate for a tube-type plant (e.g. according to DT-PS 1,161,257 and DT-PS 2,165,266).

A catalyst which is very porous and brittle is frequently applied in the production of benzene from coal gas. A catalyst of this kind, which must be replaced comparatively frequently, is appropriately applied within a hurdle-type reactor, orders of magnitude of $30m^2$ for the total surface area of a hurdle or shelf and of $400m^3$ for the total quantity of the catalyst, occurring in practice. These numerical data merely serve as examples and may either not be reached, or exceeded, within the scope of the invention.

SUMMARY OF THE INVENTION

The invention has as its essential object a suitable system for the replacement of the catalyst. The replacing operation is appropriately performed during an operational stoppage of the reactor, which may last a relatively short time, for economic and technical reasons. Moreover, in the case of oxygen enrichment of the fresh catalyst, the charging of the fresh catalyst into the reactor is required to be performed under the exclusion of air.

In accordance therewith, the invention consists in that for the purpose of as uniform as possible a feed of the catalyst throughout the cross-section of each catalyser bed, distribution pipes in communication with filling tanks lead to the upper side of the catalyser beds, whereas several draining pipes depart from the underside of each catalyser bed.

A horizontal side-by-side arrangement of several catalyser beds in the longitudinal direction of the reactor wall is appropriate, with a perforated plate reinforcing the base of each catalyser bed allowing for the traversal of the reactive gas. Each perforated plate is supported on the reactor wall and is so shaped as to allow for the protrusion of funnel-shaped sieves forming the base of each catalyser bed.

Further features of the invention consist in that the reactor wall has a connector stub pipe at each of its two extremities, in a manner known per se, for for the inflow and outflow of the respective gas Each catalyser bed has a delimiting wall at each of its sides, one delimiting wall facing towards the inflow stub pipe and the other delimiting wall facing the outflow stub pipe for the reactive gas. The delimiting walls alternatively up to oppositely situated sides of the reactor wall for the purpose of deflecting the reactive gas in order to establish a traversal of the reaction gas in the same direction, through all of the catalyser beds.

The heat exchangers co-ordinated with the catalyser beds comprise post-connected coolers in the case of exothermic reactions, and pre-connected heaters in the case of endothermic reactions, and in manner known per se contain nests of tubes which extend in the transverse direction of the reactor wall and which are traversed in their longitudinal direction by the reactive gas.

In one embodiment of the invention the reactor wall is rotatably journalled about its longitudinal axis, each catalyser bed being delimited at its upper side and its lower side by screening netting or supporting gratings, and divided along its width extending transversely to the reactor wall by at least one supporting plate extending in the direction of flow of the reactive gas.

In this embodiment heat exchangers are arranged in manner known per se below the catalyser beds with tubes extending parallel to the width of the catalyser beds.

In still another embodiment of the invention one pipe for the filling and one pipe for the draining of the catalyst, each pipe having corresponding branch pipes, are so arranged that, at an oblique position of the catalyser bed corresponding to the angle of repose of the catalyser bed, they are situated respectively above the highest and below the lowest point of the catalyser bed.

In still another embodiment of the invention the supporting gratings delimiting the underside of the catalyser beds are in two parts and may be pivoted downwards for removal of the catalyst.

In each embodiment the outflow openings of the catalyser beds lead to shut-off elements by means of which the removal of the used catalyst is possible from time to time via branch and collector pipes.

BRIEF DESCRIPTION OF THE DRAWING

The object of the invention is illustrated in the drawings by way of example wherein FIG. 5 shows a second embodiment of the invention with a rotatably journalled reactor wall in cross-section, FIG. 6 shows a portion of the reactor wall according to FIG. 5 in longitudinal elevation with the externally situated filling system for a hurdle or shelf, FIG. 7 shows a third embodiment of the invention with a reactor wall in cross-section, with one of the obliquely installed hurdles or shelves and a corresponding heat exchanger, and FIG. 8 shows a fourth embodiment of the invention with a reactor wall in cross-section with one of the horizontally installed hurdles or shelves (situated one behind another) and a downwardly pivotable supporting grating with a draining funnel.

DETAILED DESCRIPTION OF THE INVENTION

Figure 1:
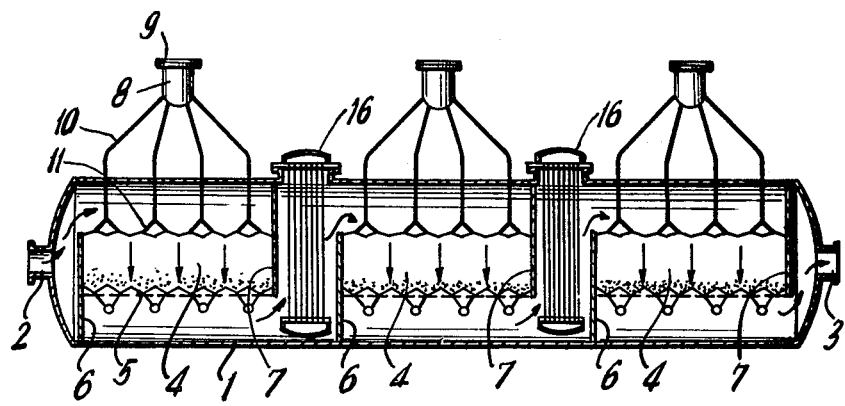
FIG. 1 shows the first embodiment of the invention with a reclining hurdle-type reactor comprising three hurdles or shelves arranged side-by-side and two heat exchangers interposed therebetween, in longitudinal cross-section through the reactor wall.
Figure 2:
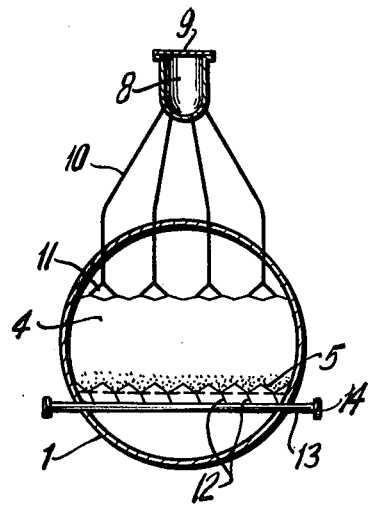
FIG. 2 shows a cross-section through the hurdle-type reactor according to FIG. 1.
Figure 3:
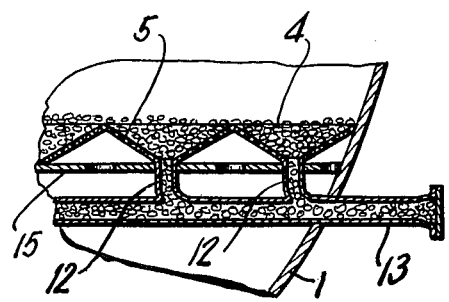
FIG. 3 shows the part of the lower portion of a catalyser bed according to FIG. 2 with the draining system to enlarged scale.

In the embodiment according to FIGS. 1 to 3, three hurdles or shelves are arranged in a horizontal position in the longitudinal direction of a stationary reactor wall 1 comprising two terminal stub pipes 2, 3 for the inflow and outflow respectively of a reactive gas. Each shelf comprises a catalyser bed 4 which is delimited in length and width by adjacent funnel-shaped sieves 5 and laterally in the longitudinal direction by delimiting walls 6, 7, the catalyser bed 4 extending to the reactor wall 1 in the transverse direction (FIG. 2). The delimiting walls 6, 7 extend partially through cross-section of the internal volume of the reactor wall 1 (FIG. 2) in the manner shown in FIG. 1.

Above each catalyser bed 4 is situated a filling tank 8 comprising a removable cover 9, with several downwardly extending distributor pipes 10 extending obliquely in the longitudinal plane (FIG. 1) and obliquely in the transverse plane (FIG. 2), from which pipes several complementary branch pipes 11 depart a little above the catalyser bed bed.

At the underside of each catalyser bed 4, short draining pipes 12 which lead in rows in each case into a collector pipe 13 extending transversely to the longitudinal plane of the reactor wall 1 and comprising a removable terminal closure 14 (FIGS. 2,3). The pipes 12 extend from the lowest points of the funnel-shaped sieves 5. Below the funnel-shaped sieves or screens 5 of each catalyser bed 4, a perforated plate 15 is situated, which has two side edges joined directly to the reactor wall 1 and the other two side edges joined directly to the delimiting walls 6, 7.

Between the catalyser beds 4 are situated two heat exchangers 16 with nests of tubes extending upright in the transverse direction of the reactor wall 1.

Figure 4:
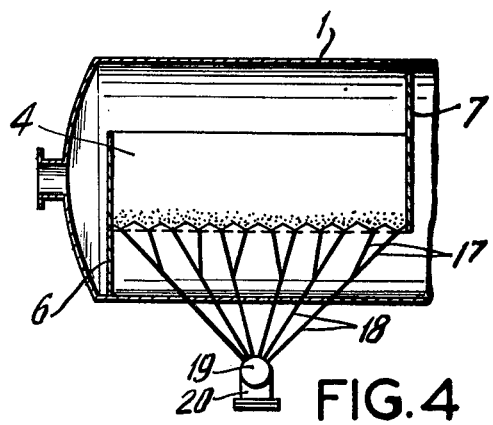
FIG. 4 shows a catalyser bed according to FIG. 1 with another draining system.

According to FIG. 4, the draining pipes 17 starting from the lowest points of the funnel-shaped sieves or screens 5 initially open into a smaller number of intermediate pipes 18, the pipes 18 then opening into a single colletor pipe 19 for each catalyser bed 4. Each of these collector pipes 19 has a closable outlet stub 20.

The embodiment according to FIGS. 5, 6 differs from the preceding one in that the reactor jacket 1 is rotatably journalled on roller mountings 21, and in that a filling pipe 22 comprising several distributor pipes 23 distributed along the length of the catalyser bed and several draining pipes 24 distributed along the length of the catalyser bed together with a subsequent common collector pipe 25, are provided for each catalyser bed 4. The distributor pipes 23 as well as the draining pipes 24 are laterally connected to the catalyser beds 4 at diametrically opposed sides and immediately below an upper or immediately above a lower delimiting screen 26, 26', respectively.

The inclined position of the catalyser beds 4 - in this case too, several catalyser beds are arranged side-by-side to form a multi-stage hurdle-type reactor just as in FIG. 1 - corresponds to the position of the reactor wall 1 only during the filling and draining operations; during operation of the reactor, the catalyser beds are situated horizontally as in the case of the preceding embodiment.

Matters are different in the case of the embodiment according to FIG. 7. This again relates to a fixed, that is non-rotatably arranged, reactor wall 1 into which the catalyser beds 4 are built inobliquely, thus always retaining this position. In this connection, several mutually parallel supporting plates 27 which do not extend quite up to the two delimiting screens 26, 26' are situated between the upper side (shown by arrows) and the underside of the catalyser beds.

By contrast to the embodiment according to FIGS. 5, 6, the filling pipe 28 present for each catalyser bed 4, and the corresponding distributor pipes 29, are situated within the reactor wall 1. The draining pipes 30 do not open into a common collector pipe in this case, but are individually equipped with removable outflow closures 31.

The heat exchangers 32 are situated below the catalyser beds 4 with tubes extending parallel to the width of the catalyser beds.

Finally, a special kind of draining system is incorporated according to the embodiment shown in FIG. 8, a supporting grating 33 serving the purpose of the lower delimitation of the catalyser bed 4 and being formed in two parts in the transverse direction of the reactor wall 1. The two parts are pivotally arranged at the outer extremity of the reactor wall and are downwardly pivotable in the direction of the arrows shown in FIG. 8. In the downwardly pivoted position, the two parts of the supporting grating 33 form inclined slick surfaces which lead into several draining pipes 34 distributed in the longitudinal direction of the reactor wall and comprising removable outflow closures 35.

The filling and draining systems are shut off, at the inflow and outflow sides, respectively, during operation of the hurdle-type reactor. The reactive gas is ducted into the reactor wall 1 at one end and traverses the three catalyser beds 4 consecutively in the same direction, downwards from above. The reactive gas traverses the two interposed heat exchangers (or coolers) 16 in the opposite direction, upwards from below. This flow line marked by arrows in FIG. 1 is caused by the delimiting walls 6, 7. In principle, the flow line of the reactive gas may also extend in reverse, i.e. upwards from below in the catalyser beds 4, and downwards from above in the heat exchangers 16.

During an exothermic reactive process, the reactive gases are heated up as usual in the area of the catalyst, and are subsequently cooled down again in the area of a heat exchanger to the original temperature or at least to a lower temperature. Whether an additional heat exchanger should be installed after the last catalyser bed inside or outside the reactor wall, depends on the temperature of the reactive gases required for subsequent use of the same.

During an endothermic reactive process - a hurdle-type reactor of this nature is also applicable fundamentally for this purpose and therefore lies within the scope of the invention - heat exchangers acting as heaters should be incorporated in a manner known per se instead of the coolers, one of these being arranged before the first catalyser bed with respect to the flow line of the reactive gas, if appropriate.

In order to drain the used catalyst beds 4, the operation is stopped briefly by shutting off the supply of reactive gas. The closures at the outflow points of the lower collector pipes or draining pipes are then opened. So that the draining operation may be performed in as short a time as possible, it is advisable to draw off the mass of catalyst by means of a suction system which is not illustrated.

After the draining of the catalyser beds, the collector pipes or draining pipes are closed off again. The charging tanks or charging pipes are then connected to a mobile storage tank which is not illustrated. If the charging of the catalysts should be performed under exclusion of air, a heavy gas is ducted into the reactor wall and the storage tank beforehand, to displace the air. When the catalyser beds are fully charged, the mass of catalyst on its upper side forms small conical heaps whereof the number and height depend on the number and mutual spacing of the distributor pipes.

In the embodiments according to FIGS. 5, 6 and FIG. 7, the charging and draining of the catalyser beds are performed in the inclined position of the same, which corresponds approximately to the angle of repose of the mass of catalyst. In this case, not only the draining but also the charging operation is appropriately performed pneumatically, the latter thus by insufflation of the catalyst.

In the embodiment according to FIG. 8, the draining operation for each catalyser bed is accelerated by downward pivoting of the two-piece supporting grating.

In all embodiments, the catalyser beds and the heat exchangers may be identically or differently dimensioned with respect to each other, in a manner known per se.

We claim:

1. Multi-stage hurdle-type reactor for catalytic exothermic and endothermic chemical processes comprising a tubular shaped reactor wall with the axis thereof arranged horizontally and forming a reaction space therein, said reactor wall having a first end and a second end spaced apart in the axial direction thereof from said first end, said first and second ends extending transversely of said reactor wall axis and providing closures for the opposite ends of said reactor wall, an inlet in said first end for admitting a reactive gas into said reaction space, an outlet in said second end for discharging the reactive gas after it flows through said reaction space, a plurality of serially arranged catalyser beds mounted within said reaction space and spaced apart in the axial direction thereof, each of said catalyser beds having a horizontally disposed upper surface to which the catalyst is fed and a horizontally arranged lower surface located below the upper surface on which the catalyst is supported and to which the catalyst exits, a plurality of distributor pipes extending downwardly into said reaction space for each of said plurality of catalyser beds, a plurality of draining pipes extending downwardly from said reactor wall for each of said plurality of catalyser beds, each of said draining pipes having an end spaced outwardly from said reactor wall for the exit of the catalyser from said draining pipe for each said catalyser bed, each of said catalyser beds having a first end and a second end extending transversely of the axis of said reactor wall and located at the opposite ends of said beds, each of said plurality of catalyser beds comprises an upright first delimiting wall located at the first end of said bed and extending downwardly from said upper surface past said lower surface and being connected to one portion of said reactor wall, an upright second delimiting wall located at the second end of said bed and extending upwardly from said lower surface past said upper surface and being connected to another portion of said reactor wall, said one portion and said another portion of said reactor wall being diametrically opposed to one another so that reactive gas entering the space in said reactor wall from said inlet is forced to flow in a generally horizontally extending tortuous path through said catalyser beds flowing over said first delimiting wall through one of said catalyser beds and then under said second delimiting wall, and said lower surface of each of said plurality of catalyser beds being planar and comprising a first pivotal plate pivoted to one axially extending portion of said reactor wall and a second pivotal plate pivoted to another axially extending portion of said reactor wall spaced chordally from one axially extending section, said one portion located opposite said another portion so that said first pivotal plate and second pivotal plate can be pivoted downwardly from the plane of said lower surface away from one another for dropping the catalyst downwardly for flow through said draining pipes opening from said reactor wall.

2. Multi-stage hurdle-type reactor for catalytic exothermic and endothermic chemical reactions comprising a tubular shaped reactor wall with the axis thereof arranged horizontally and forming a reaction space therein, said reactor wall having a first end and a second end spaced apart in the axial direction thereof from said first end, said first and second ends extending transversely of said reactor wall axis and providing closures for the opposite ends of said reactor wall, an inlet in said first end for admitting a reactive gas into said reaction space, an outlet in said second end for discharging the reactive gas after it flows through said reaction space, a plurality of serially arranged catalyser beds mounted within said reaction space, and spaced apart in the axial direction thereof, each of said catalyser beds having an upper surface through which the catalyst is fed and a lower surface below the upper surface on which the catalyst is supported and through which the catalyst exits, a plurality of distributor pipes disposed in parallel relation and extending through said reactor wall into said reaction space therein for each of said plurality of catalyser beds, each distributor pipe having one end in communication with said upper surface of one of said catalyser beds and another end located exteriorly of said reactor wall, a filling pipe extending in the axial direction of said reactor wall and located exteriorly of said reactor wall and connected to the other ends of said distributor pipes, a plurality of draining pipes extending from said reactor wall for each of said catalyser beds, each said draining pipe having a first end in communication with said catalyser bed at the lower surface thereof and a second end located exteriorly of said reactor wall for the exit of the catalyser from said draining pipe of one of said catalyser beds, each of said catalyser beds having a first end and a second end extending transversely of the axis of said reactor and located at the opposite ends of said bed, each of said plurality of catalyser beds comprising an upright first delimiting wall located at the first end of said bed and extending downwardly from said upper surface past said lower surface and being connected to one portion of said reactor wall, and an upright second delimiting wall located at the second end of said bed and extending upwardly from said lower surface past said upper surface and being connected to another portion of said reactor wall, said one portion and said another portion of said reactor wall being diametrically opposed to one another so that reactive gas entering the space in said reactor wall flows from said inlet in a tortuous generally horizontal path through said catalyser beds flowing over said first delimiting walls and under said second delimiting walls, means for rotatably mounting said reactor wall for rotating said reactor wall about an axis extending in parallel with the axis thereof.

3. Multi-stage hurdle-type reactor for catalytic exothermic and endothermic processes comprising a tubular shaped reactor wall with the axis thereof arranged horizontally and forming a reaction space therein, said reactor wall having a first end and a second end spaced apart in the axial direction thereof from said first end, said first and second ends extending transversely of said reactor wall axis and providing closures for the opposite ends of said reactor wall, an inlet in said first end for admitting a reactive gas into said reaction space, an outlet in said second end for discharging the reactive gas after it flows through the reaction space, a plurality of serially arranged catalyser beds mounted within said reaction space and spaced apart in the axial direction thereof, each of said catalyser beds having an upper surface through which the catalyst is fed and a lower surface below the upper surface on which the catalyst is supported and through which the catalyst exits, a plurality of distributor pipes extending downwardly into said reaction space for each of said plurality of catalyser beds, each said distributor pipe having one end in communication with said upper surface of one of said plurality of catalyser beds and another end located above said reactor wall and in communication with a source of catalyst so that the catalyser is fed to one of said plurality of catalyser beds, a plurality of draining pipes extending downwardly within said reactor walls for each of said plurality of catalyser beds, each said draining pipe having a first end in communication with said lower surface of one of said plurality of catalyser beds and a second end spaced from said first end for the exit of the catalyst from said drain pipe of one of said plurality of catalyser beds, each of said catalyser beds having a first end and a second end extending transversely of the axis of said reactor and located at the opposite ends of said bed, each of said plurality of catalyser beds comprising an upright first delimiting wall located at the first end of said bed and extending downwardly from said upper surface past said lower surface and being connected to one portion of said reactor wall, an upright second delimiting wall located at the second end of said bed and extending upwardly from said lower surface past said upper surface and being connected to another portion of said reactor wall, said one portion and said another portion of said reactor wall being diametrically opposed to one another so that reactive gas entering said reaction space from said inlet is forced to follow a certain path through said catalyser beds in the axial direction of said reactor wall by said first delimiting walls and said second delimiting walls, each of said plurality of catalyser beds comprising a first grating forming said upper surface and a second supporting grating forming said lower surface, said plurality of distributor pipes for each of said plurality of catalyser beds extend parallel to each other and span each said catalyser bed in the axial direction of said reactor wall, said second end of each of said plurality of distributor pipes being connected to said upper surface along one axially extending edge thereof, said plurality of draining pipes for each of said plurality of catalyser beds extend parallel to each other and span each said catalyser bed in the axial direction of said reactor wall, each of said plurality of draining pipes being connected to said lower surface along one axially extending edge thereof, said one axially extending edge of said lower surface being connected to a portion of said reactor wall diametrically opposite to that portion of said reactor wall connected to said one axially edge of said upper surface, each of said distributor pipes is mounted within said reactor wall and each of said draining pipes is mounted within said reactor wall, a plurality of heat exchangers, each of said plurality of heat exchangers having a nest of tubes mounted below said lower surface of one of said plurality of catalyser beds, and said plurality of catalyser beds extending along said reactor wall in the axial direction thereof.

4. Multi-stage hurdle-type reactor for catalytic exothermic and endothermic chemical processes comprising a tubular shaped reactor wall with the axis thereof arranged horizontally and forming a reaction space therein, said reactor wall having a first end and a second end spaced apart in the axial direction thereof from said first end, said first and second ends extending transversely of said reactor wall axis and providing closures for the opposite ends of said reactor wall, an inlet in said first end for admitting a reactive gas into said reaction space, an outlet in said second end for discharging the reactive gas after it flows through said reaction space, a plurality of serially arranged catalyser beds mounted within said reaction space and spaced apart in the axial direction thereof, each of said catalyser beds having an upper surface through which the catalyst is fed and a lower surface below the upper surface on which the catalyst is supported and through which the catalyst exits, a plurality of distributor pipes extending downwardly into said reaction space for each of said plurality of catalyser beds, each said distributor pipe having one end in communication with said upper surface of one of said plurality of catalyser beds and another end located above said reactor wall and in communication with a source of catalyser so that the catalyser is fed to each said catalyser bed, a plurality of draining pipes extending downwardly from said reactor wall for each of said plurality of catalyser beds, each said draining pipe having a first end in communication with said lower surface of one of said plurality of catalyser beds and a second end spaced from said first end for the exit of the catalyser from said draining pipe of the one of said plurality of catalyser beds, each of said catalyser beds having a first end and a second end extending transversely of the axis of said reactor and located at the opposite ends of said bed, each of said plurality of catalyser beds comprising an upright first delimiting wall located at the first end of said bed and extending downwardly from said upper surface past said lower surface and being connected to one portion of said reactor wall, an upright second delimiting wall located at the second end of said bed and extending upwardly from said lower surface past said upper surface and being connected to another portion of said reactor wall, said one portion and said another portion of said reactor wall being diametrically opposed to one another so that reactive gas entering said reaction space from said inlet is forced to follow a certain path through said catalyser beds in the axial direction of said reactor wall by said first delimiting walls and said second delimiting walls, each of said plurality of catalyser beds being mounted in said reaction space in a horizontal position parallel with said axial direction thereof, said plurality of catalyser beds comprising at least three catalyser beds, a plurality of heat exchangers located in said reaction space, each of said heat exchangers having a nest of tubes, the tubes in each of said plurality of heat exchangers being mounted in a direction transverse to the axial direction of said reactor wall and spaced from one another by one of said plurality of catalyser beds, whereby the reactive gas entering said reaction space passes through a first catalyser bed located closest to said inlet, then through one of said heat exchangers, and then alternately through another catalyser bed and another heat exchanger.

5. A multi-stage hurdle-type reactor according to claim 4, wherein each of said plurality of catalyser beds comprises a first grating forming said upper surface and a second supporting grating forming said lower surface.

6. The multi-stage hurdle-type reactor according to claim 5, wherein said plurality of distributor pipes for each of said plurality of catalyser beds extend parallel to each other and span each said catalyser bed in the axial direction of said reactor wall, said second end of each of said plurality of distributor pipes being connected to said upper surface along one axially extending edge thereof.

7. The multi-stage hurdle-type reactor according to claim 6, wherein said plurality of draining pipes for each of said plurality of catalyser beds extend parallel to each other and span each said catalyzer bed in the axial direction of said reactor wall, each of said plurality of draining pipes being connected to said lower surface along one axially extending edge thereof, said one axially extending edge of said lower surface being connected to a portion of said reactor wall diametrically opposite to that portion of said reactor wall mounting said one axially extending edge of said upper surface.

8. The multi-stage hurdle-type reactor according to claim 5, wherein each of said plurality of catalyser beds comprises at least one supporting plate dividing the catalyser bed into a plurality of sections, said at least one supporting place extending in a direction between the upper and lower surfaces of the catalyser bed and in the axial direction of said reactor wall.

9. The multi-stage hurdle-type reactor according to claim 7, wherein each of said distributor pipes extends from outside of said reactor wall through said reactor wall and to said one catalyser bed, and each of said draining pipes extends from outside of said reactor wall through said reactor wall.

10. The multi-stage hurdle-type reactor according to claim 7, wherein each of said distributor pipes is mounted within said reactor wall, and each of said draining pipes is mounted within said reactor wall.

11. The multi-stage hurdle-type reactor according to claim 4, wherein said plurality of distributor pipes for each of said plurality of catalyser beds comprises a plurality of first pipes extending from a source of catalyst at an oblique angle to the axial direction of said reactor wall and at an oblique angle relative to a horizontal line perpendicular to the axial direction, and a plurality of second pipes extending from said plurality of first pipes and connected to said upper surface, two of said plurality of second pipes extending from each of said plurality of first pipes.

12. The multi-stage hurdle-type reactor according to claim 11, wherein a plurality of juxtaposed funnel-shaped screens form said lower surface of said catalyst bed, said plurality of draining pipes for each of said plurality of catalyser beds extend downwardly from said plurality of funnel-shaped screens, and a collector pipe connecting the ends of said plurality of draining pipes spaced downwardly from said funnel-shaped screens to drain the used catalyst.

* * * * *